Aug. 13, 1940.  A. LE FEBVRE  2,211,278
FISHING ROD SUPPORT
Filed Nov. 29, 1939
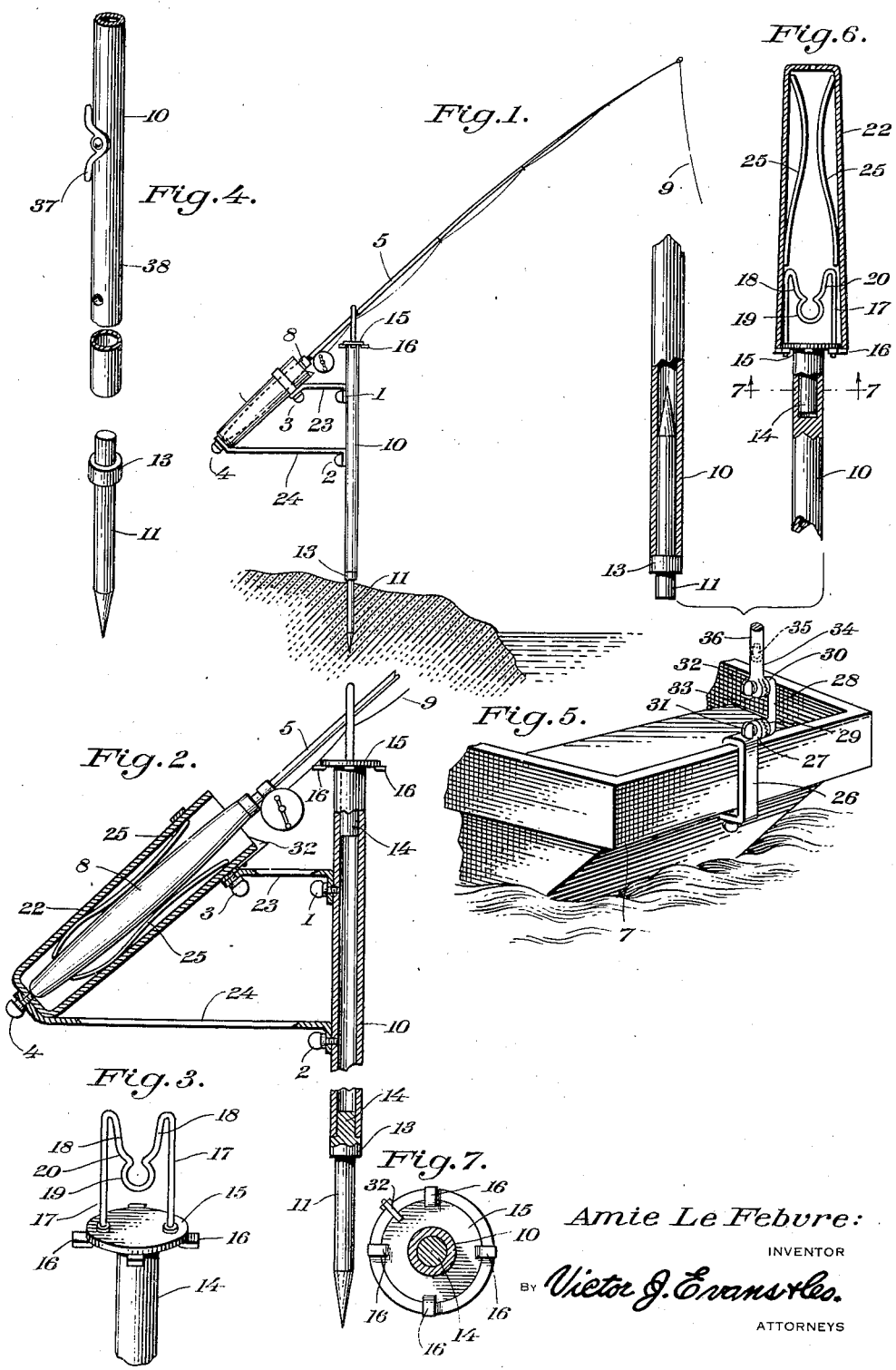
Amie Le Febvre:
INVENTOR Patented Aug. 13, 1940

2,211,278

UNITED STATES PATENT OFFICE 2,211,278

FISHING ROD SUPPORT

Aime Lefebvre, Montreal, Quebec, Canada

Application November 29, 1939, Serial No. 306,737

4 Claims. (Cl. 248—45)

This invention relates to a fishing rod support, and has for an object to provide a device adapted to permit the rod to follow in the direction of a cast or the play of a fish.

A further object of the invention is to provide a detachable rod supporting device adapted to engage the ground or a boat.

A still further object is to provide means to secure the parts to a staff at both ends while being carried or stored.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a fishing rod support constructed in accordance with the invention and shown supporting a fishing rod.

Figure 2 is a longitudinal sectional view of the support showing the fishing rod handle gripping means.

Figure 3 is a perspective view of the combined rod rest and line guide.

Figure 4 is a perspective view of a modified form of the invention for hand lines.

Figure 5 is a perspective view of a boat bracket for mounting the support.

Figure 6 is a longitudinal sectional view of the parts of the invention in position to be carried or stored.

Figure 7 is a cross sectional view taken on the line 7—7 of Figure 6.

Referring now to the drawing in which like characters of reference designate similar parts in the various views, 10 designates a tubular staff which is adapted to be rotatably supported on the upper end of a ground engaging stake 11 and abut a collar 13 formed on the upper end of the stake, as shown in Figure 7. Arms 23 and 24 of different lengths are removably secured to, and extend laterally from, the staff 10. The shorter arm 23 is located above the longer arm 24 and the arms have angular ends which are removably secured by set screws 1, 2, 3 and 4 to the staff and to a socket 22 adapted to receive the handle 8 of a fishing rod 5. The angle of the socket 22 relative to the staff 10 is controlled by the difference in length of the upper and lower arms.

A plug 14 frictionally fitted into the upper end of the staff 10 carries a disc 15 provided with radially extending ears 16 for supporting the peripheral edge of the mouth of the socket 22, which in inverted position, receives the disc 15, and is locked to the disc by a spring latch 32, best shown in Figures 2 and 7, for storage or transportation.

A substantially M-shaped member 17 is secured at the bottom of its legs on the disc 15. The converging arms 18 of the member merge at the extremities into a loop 19 which forms a guide to receive a fishing line 9. The open end of the loop is constricted to form a rod rest 20.

Leaf springs 25, mounted in the socket 22, grip the fishing rod handle 8 and prevent accidental displacement of the handle from the socket and also prevent accidental displacement of the fishing rod 5 from the rod rest 20.

A modified form of the invention to be used on a boat 7 is shown in Figure 5. This form of the invention provides a C clamp 26 adapted to be attached to the stern of the boat and having an eye 27 at the upper end provided with a serrated face. A coupling link 28 is provided with lower and upper eyes 29 and 30 having serrated faces. A screw 31 is engaged through the eye 27 of the C clamp and lower eye 29 of the link. A screw 32 is engaged through the upper eye 30 of the link and through a lower eye 33 formed on a rod 34. The eye 33 also has a serrated face. The rod 34 is provided with a reduced upper end 35 adapted to be frictionally fitted in the lower end of the tubular staff 36. The serrated faces permit the parts to be locked in angularly adjusted positions by the set screws.

A form of the invention used for hand lines is shown in Figure 4. In this form of the invention a cleat 37 mounted on the staff 38 between its ends to hold windings of, or the end of, a hand fishing line.

In operation the stake 11 is driven into the ground, the arms 23 and 24, the staff 10 and the socket 22 are assembled by inserting the set screws 1, 2, 3 and 4. The rod 5 is then placed in the rod rest 20 and the handle 8 is slipped into the socket in engagement with the gripping springs 25. A cast of the fishing line may be made before inserting the handle or the line may be cast by hand. The rod is free to swing with the staff in the direction of the play of a fish since the staff may turn freely on the stake and leave the fisherman's hands free to reel or pull in fish.

When it is desired to disassemble the device for transportation or storage, the socket 22 and the stake 11 are placed in the position shown in Figure 6, by removing the set screws 1, 2, 3 and 4. The arms 23 and 24 may be carried in a case with the staff or in a separate case if desired.

From the above description it is thought that the construction and operation of the invention will be fully understood without further explanation.

What is claimed is:

1. A fishing rod support comprising a rotary staff, means for securing the staff to a support, a combined rod rest and a line guide mounted on the upper end of the staff, laterally extending arms of respectively different lengths secured to the staff, and a tubular socket adapted to receive a fishing rod handle secured to the arms and inclined toward the combined rest and guide.

2. A fishing rod support comprising a stake having a collar near its upper end, a staff rotatably mounted to turn on the stake as an axis and abutting the collar, a disc mounted on the upper end of the staff having radially extending ears below the plane of the disc, a substantially M-shaped member anchored to the disc having converging arms forming a loop at their meeting ends to guide a fishing line, the open end of the loop being restricted to form a fishing rod rest, and a socket adapted to receive the handle of a fishing rod secured to the staff to rotate with the staff.

3. A fishing rod support comprising a support having a reduced upper end and a collar at the base of the reduced end, a staff rotatably mounted on the reduced end and supported by the collar, a member formed to provide a fishing rod rest and a line guide below the rest mounted on the free end of the staff, and a fishing rod handle holding means secured to the staff and disposed at an angle to the staff to rotate as a unit with the staff.

4. A fishing rod support comprising a staff, a disc having radially disposed ears below the upper face of the disc, a substantially M-shaped member having legs secured to the disc and between its legs having converging arms, the meeting extremities of the arms forming a line guide loop, a handle socket secured at an angle to the staff adapted to receive a fishing rod at an angle to the staff, said socket being adapted to be inverted on the staff and frictionally receiving the disc and to be supported by said ears when not in use, and a locking means attached to the socket and adapted to engage the disc.

AIME LEFEBVRE.